Dec. 19, 1961   D. K. D. FOSTER ET AL   3,013,310
METHOD OF FORMING FLANGES ON THE ENDS OF THERMOPLASTIC PIPE
Filed July 7, 1959
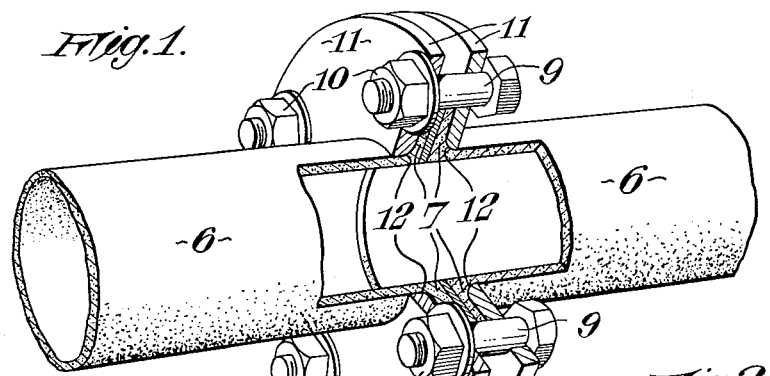
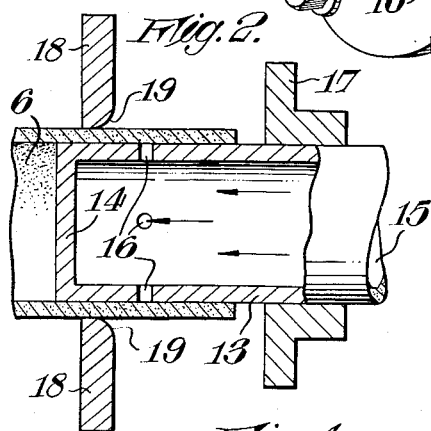
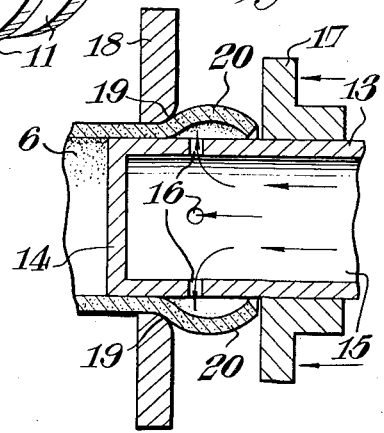
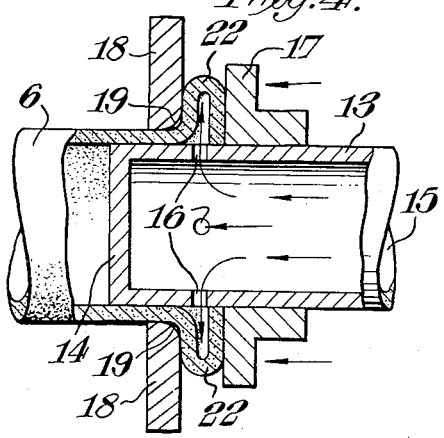
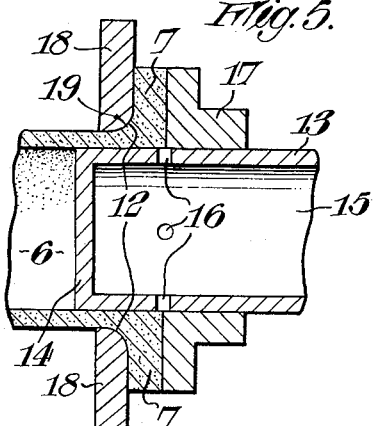
INVENTORS
DAVID K. D. FOSTER
LESLIE D. DONE
BY Kurt Kelman
Agent United States Patent Office 3,013,310
Patented Dec. 19, 1961

3,013,310
METHOD OF FORMING FLANGES ON THE ENDS OF THERMOPLASTIC PIPE
David K. D. Foster and Leslie D. Done, Staffordshire, England, assignors to Foster Brothers Plastics Limited, Wednesbury, England
Filed July 7, 1959, Ser. No. 825,575
Claims priority, application Great Britain July 8, 1958
2 Claims. (Cl. 18—56)

This invention relates to a method of forming flanges on the ends of thermoplastic pipe.

Presently, thermoplastic pipe is popularly employed for conveying fluids (gaseous and liquid) due to its inherent flexibility and comparative lightness and bendability to metal pipe, thus making thermoplastic pipe (hereinafter referred to as plastic pipe) readily adaptable to many industrial and domestic uses.

A problem arises however, in providing the pipe with satisfactory end flanges for coupling the ends to adjoining plastic pipes or to articles by the conventional nuts and bolts applicable to the flanged ends of metal pipes. If the formation of the plastic flange is made by the conventional high temperature welding technique, there is a danger of damaging the plastic material, in that fracture and/or leaking may arise either at the flange or at its junction with the wall of the pipe.

The primary object of the invention is to provide a simple and inexpensive method providing integral flanges at the ends of plastic pipe unaccompanied by the danger above referred to.

The method according to the invention broadly resides in sleeving an end of a plastic pipe on a cylindrical mandrel having a peripheral port thereon, introducing a hot pressurised gaseous medium through said port so as to render said end flexible and to dilate it into a pocket surrounding the mandrel, and then pressing the expanded end against a wall of said pocket so as to form the expanded end into a corrugated, welded flange. From this statement it will be appreciated that according to this method the hot pressurised gas will initially soften the pipe, then blow it outwardly into the pocket as a balloon and finally the balloon is compressed into a consolidated flange against the said wall.

In order that the invention may be thoroughly understood, pipes made of plastics having flanges constructed in accordance with the invention, and diagrams illustrating the process by which the flanges are formed, are illustrated, by way of example, on the accompanying drawing, wherein:

FIG. 1 is a perspective view of flanged plastic pipes clamped together coaxially.

FIG. 2 is a longitudinal sectional elevation illustrating the preliminary step of sleeving a plastic pipe on a cylindrical, ported mandrel.

FIG. 3 is a longitudinal section for illustrating the next step of introducing a hot pressurised gaseous medium into the mandrel and indicating its escape for producing an initial ballooning of the sleeved pipe.

FIG. 4 is a view similar to FIG. 3 illustrating the developed ballooning of the pipe and the initial movement of pressing the ballooned part against an abutment.

FIG. 5 illustrates the final pressing operation and the formation of a consolidated flange.

As will be observed in the drawing with reference to FIG. 1, coaxial pipes 6 made of polythene, or other known plastics capable of deformation under heat treatment, have terminal flanges 7 disposed perpendicularly to the axis of the pipes. Each flange 7 is double or nearly double the wall thickness of the pipe 6. The flanges 7 are clamped face to face by means of bolts and nuts 9 and 10 and external backing rings 11. The junction 12 is radiused to provide seatings for corresponding radiused parts of the rings 11.

Each flange 7 is produced in the following manner reference being made to FIGS. 2–5. An end part of the plastic pipe 6 is sleeved over a hollow cylindrical mandrel 13 of which one end 14 is closed fluid-tight and the other 15 provides an axial inlet for a hot gas such as air, steam or other inert gas indicated by the arrows. The hollow mandrel 13 is provided with ports 16 which communicate with the bore of the pipe 6. A flanged pressure plate 17 is mounted coaxially over the mandrel 13 for reciprocal movement under the control of an operator, the plate 17 being, for example, manually or automatically controlled by a press button or other automation. An abutment wall 18, in the form of a ring, which is perpendicular to the axis of the mandrel 13, has an inner radiused bore 19, said wall being removable so as to permit the plastic pipe being sleeved over the mandrel 13 to a required distance. The mouth of the plastic pipe may be adapted to engage an annular groove formed in the pressing face of the pressing plate 17, so that the said mouth can be held by the plate concentrically on the mandrel during a preliminary hot pressurised warming of the pipe.

The pressure plate 17 is adapted to be advanced towards the adjacent end of the pipe 6 at a predetermined time after the end of the plastic pipe 6 has been rendered plastic by the pressurised gas. As the hot pressurised gas heats the mandrel 13 and flows through the ports 16, the gas causes the end part of the plastic pipe 6 to expand and balloon between the abutment 18 and the pressure plate 17. The initial ballooning is indicated at 20 FIG. 3 whilst the pressure plate 17 has advanced towards the adjacent end 21 of the pipe 6 so as to reduce to a minimum the escape of gas and urge the expanded part towards the abutment 18. As further ballooning 20 proceeds accompanied by further displacement of the pressure plate 17 the ballooning 20 is developed into an inwardly turned U shape indicated at 22 FIG. 4, and subsequently the continued movement of the pressure plate 17 forms the U shape 22 into the radial flange 7 FIG. 5 of double or nearly double thickness in relation to the wall thickness of the pipe 6, the double thickness or less of plastic material being formed into a welded consolidated flange by which the pipe 6 can be coupled coaxially as seen in FIG. 1. It will be appreciated that the simple operation of blowing up the warmed end part of the plastic pipe 6 in the above manner causes the said end to be formed into a lapped joint when pressure is exerted as above described. If the flange 7 needs to be in excess of double or nearly double thickness it would merely be necessary to form an additional similar operation on the tube.

It will be appreciated that the invention is not limited to the details above described and that modification may be made from the basic ideas above expressed and defined in the appended claims.

What we claim is:

1. A method of forming a flange on the end of a plastic pipe which resides in sleeving an end of the pipe on a cylindrical mandrel having peripheral ports thereon, introducing a hot pressurised gas through said ports so as to render said end flexible and to dilate it into a pocket surrounding the mandrel, and then pressing the expanded end against an abutment so as to form the expanded end into a welded terminal flange of a thickness substantially exceeding the thickness of the pipe wall.

2. A method according to claim 1 in which the expanded end of the pipe is pressed against a ring-like abutment by means of a pressure plate axially movable on the mandrel.

(References on following page)

References Cited in the file of this patent

UNITED STATES PATENTS

| | | |
|---|---|---|
| 2,099,055 | Ferngren | Nov. 16, 1937 |
| 2,347,101 | Harding | Apr. 18, 1944 |
| 2,608,501 | Kimble | Aug. 6, 1952 |
| 2,712,157 | Holte | July 5, 1955 |
| 2,779,996 | Tanis | Feb. 5, 1957 |
| 2,977,633 | Breitenstein | Apr. 4, 1961 |

FOREIGN PATENTS

| | | |
|---|---|---|
| 821,792 | Great Britain | Oct. 14, 1959 |
| V9142XI1/47F | Germany | July 26, 1956 |